United States Patent [19]

Smolinski et al.

[11] 3,993,857

[45] Nov. 23, 1976

[54] METHOD FOR PREPARING SYNTHETIC POWDERS BASED ON POLYVINYL CHLORIDE OR VINYL CHLORIDE COPOLYMERS

[75] Inventors: Manfred Smolinski, Marl; Josef Kalka, Herten, both of Germany

[73] Assignee: Chemische Werke Huls Aktiengesellschaft

[22] Filed: Sept. 11, 1974

[21] Appl. No.: 505,069

[30] Foreign Application Priority Data
Sept. 27, 1973  Germany............................ 2348592

[52] U.S. Cl. ............................... 528/502; 159/4 B; 526/344
[51] Int. Cl.²....................... C08F 47/00; C08F 3/30
[58] Field of Search............. 159/4 B; 528/502, 344

[56] References Cited
UNITED STATES PATENTS

| | | | |
|---|---|---|---|
| 2,187,877 | 1/1940 | Ferris............................. | 260/92.8 A |
| 3,208,965 | 9/1965 | Kuhne............................. | 260/30.6 |
| 3,803,111 | 4/1974 | Munro............................. | 260/89.55 |
| 3,805,869 | 4/1974 | Winter............................. | 159/4 B |

*Primary Examiner*—Christopher A. Henderson, Jr.
*Attorney, Agent, or Firm*—Gilbert L. Wells

[57] ABSTRACT

The method for preparing synthetic powders based upon polyvinyl chloride or vinyl chloride copolymers by spray drying the polymer dispersions is improved by using single material nozzles with atomizing pressures of about 550 to 1000 bars where a bar is a C.G.S. unit of pressure equal to 750 mm of Hg.

5 Claims, No Drawings

METHOD FOR PREPARING SYNTHETIC POWDERS BASED ON POLYVINYL CHLORIDE OR VINYL CHLORIDE COPOLYMERS

CROSS REFERENCES TO RELATED APPLICATIONS

Applicants claim priority under 35 U.S.C. 119 for Application P 23 48 592.9, filed Sept. 27, 1973 in the Patent Office of the Federal Republic of Germany.

The disclosure of assignee's copending application Ser. No. 505,045, filed Sept. 11, 1974, having as inventors Josef Kalka et al, and entitled "Method for Preparing Synthetic Powders Based on Polyvinyl Chloride or Vinyl Chloride Copolymers Containing Emulsifiers" is incorporated herein to show the state of the art of preparing synthetic powders by spray drying vinyl chloride polymer dispersions through a two-fluid atomizer.

BACKGROUND OF THE INVENTION

The present invention relates to a method for preparing synthetic powders based upon polyvinyl chloride or vinyl chloride copolymers by spray drying polymer dispersions through single material nozzles.

The state of the art of vinyl chloride polymer and copolymer emulsions useful in the present invention may be ascertained by reference to U.S. Pat. Nos. 2,140,048; 3,627,717; and 3,732,178, and the Kirk-Othmer "Encyclopedia of Chemical Technology", 2nd Edition, Vol. 21, (1970), pages 369–412, particularly pages 373–374 where Emulsion Polymerization is disclosed, and pages 403–404 where Dispersion Resins which include plastisols and plastigels are disclosed. Kirk-Othmer states that plastigels are plastisols having high viscosities and yield values and that putty-like paste may be prepared therefrom. The state of the art of spray drying, pneumatic atomizers and polyvinyl chloride polymer and copolymer powders produced therewith may be ascertained by reference to U.S. Pat. No. 3,805,869 and Kirk-Othmer, Vol. 7 (1965), pages 360–368, under the section entitled "Dispersion Type Direct Dryers", particularly pages 362–364 wherein spray dryers and pneumatic atomizers are disclosed. U.S. Pat. No. 3,805,869 discloses the preparation of uniform, finely divided powdery vinyl chloride polymer particles containing less than 2 weight percent particles having a diameter greater than 40 microns obtained by spray drying an aqueous dispersion of the polymer and a carrier gas through a two-fluid atomizer.

As known to the art, plastisols i.e., dispersions of synthetic or plastic powders in softening agents, are prepared from these synthetic powders, as disclosed in Kainer's monograph, "Polyvinylchlorid und Vinylchlorid-Mischpolymerisate", Springer, 1965, page 332 ff. The industrially preferred method for making synthetic powders suitable for plastisol preparation is spray drying of polymer dispersions.

When such a process is used, the polymer dispersion is sprayed into a flow of hot air by means of an atomization instrument. The dried product is obtained at the lower end of the tower-like drying chamber via a bag filter or similar dust removing facility, as disclosed in Ullmann's "Encyklopaedie der Technischen Chemie", 1951, first volume, page 602 ff. Mainly the binary material nozzle is used in practice for drying polymer dispersions. The single material nozzle (liquid pressure nozzle) however is advantageous as regards energy consumption. Nevertheless, because it is very prone to clogging, it has not been widely used for the spray drying of synthetic powders. It is self-evident that ever recurring clogging of the nozzle channels causes unreliable operation and frequent shut-downs, and considerable cost in cleaning even if the nozzle can be easily taken apart.

The single material nozzle has not been used so far especially as regards the preparation of synthetic powders suitable for plastisol formation, because comparatively narrow nozzle cross sections are used which, therefore, tend to clog appreciably. These narrow nozzles are used in order to achieve the required fineness of particles.

SUMMARY OF THE INVENTION

Having in mind the limitations of the prior art, a method has now been found for preparing plastic or synthetic powders based on polyvinyl chloride or vinyl chloride copolymers, using spray drying of polymer dispersions with single material nozzles, wherein the atomization pressure exceeds 500 bars where a bar is a C.G.S. unit of pressure equal to 750mm of Hg. Advantageously the spraying pressure is from about 550 to 1,000 bars, preferably and especially from about 650 to 900 bars. In the present methods, pressure from 1 to 50 bars were employed in spray drying, as disclosed by Vauch-Mueller, in Grundoperationen chemischer Verfahrenstechnik, (1966) published by Steinkopff, Dresden and Leipzig, page 277. When the method of the present invention is used, single material nozzles are employed without there being any symptons of clogging and hence there being no interruptions of any kind in the operations for preparing even the finest synthetic powders by means of spray drying.

The method of the present invention permits the use of nozzles with orifice diameters ranging from about 0.3 to 0.6 mm for spray drying polyvinyl chloride or copolymer lattices and therefore for obtaining powders with less than 2 percent by weight of grains larger than 40 microns. Such powders are inherently suitable for pastes, i.e., they are inherently fine enough for paste preparation and no longer require grinding and air sifting. Therefore, one may wholly dispense with grinding and air sifting, eliminating furthermore the damage which is inflicted on the grain during grinding. Following spray drying, the powder is merely sifted to remove contamination from the wall cakings of the spray tower.

DESCRIPTION OF THE PREFERRED EMBODIMENTS

Dispersions applicable to spray drying purposes and useful in the present invention are vinyl chloride-homo or copolymer dispersions prepared in conventional manner by emulsion polymerization as disclosed in U.S. Pat. Nos. 2,140,048; 3,627,717; and 3,732,178 and the Kainer monograph ibid, p. 34 ff. Suitable comonomers include, but are not limited to vinyl acetate, vinylidene chloride, vinyl ether, acrylonitrile and acrylic acid ester. The comonomer may be present in a concentration up to 20 mole percent, preferably from 0.2 to 10 mole percent based on the copolymer.

All of the conventional emulsifiers such as alkylsulfonates, alkylsulfates, alkylbenzol-sulfonates and salts of fatty acids used for emulsion polymerization of vinyl chloride may be used.

The dispersions contain conventional amounts of emulsifiers, for instance 2 percent by weight, but also appreciably larger amounts, for instance 3–5 percent by weight, and further lesser amounts, for instance as little as 0.3 percent by weight based on the weight of the monomer. The solid content of the dispersion also remains within conventional bounds. It is for instance 30 – 70 percent by weight, preferably it should be 45 – 60 percent by weight based on the weight of the emulsion.

Nozzle spraying takes place in spray drying towers of conventional design, such as disclosed by M. Kainer in "Polyvinylchloride and Vinylchloride Copolymers", as published by Springer-Verlag, Berlin/Heidelberg/New York (1965), at page 5.

The tower size is arbitrary. The general industrial equipment has an evaporation output of 0.5 – 10.0 tons of water per hour.

Examples of single material nozzles useful in the present invention are disclosed in Vauch/Mueller ibid, pages 276 and 277. Any soundly designed single material nozzle is suitable as an atomization nozzle for the present method; however, on account of erosion, those nozzles are preferred, which are equipped with anitwear parts made of hard, for instance sintered substances. Examples are hard metals, ceramics, synthetic precious stones, borated and nitrated materials. The nozzle orifice diameter preferably is from about 0.3 to 0.6 mm. The angle of aperture of the spraying cone falls between about 60° and 120° depending on the operating conditions.

Advantageously, the dispersion is raised to pressure required for atomization by a piston membrane pump such as disclosed by Leuschner in "Kleines Pumpenhandbuch fuer Chemie und Technik", published by Verlag Chemie, Weinheim/Bergstr. (1967), at pp. 259 and 266. The dispersion is fed to the nozzles via a pipe conduit. Appropriately, and by means of a wind chamber or blast box, of a multi-pump or the like, the pulsing of the piston membrane pump is damped to a residual pulse of less than 5 percent.

EXAMPLE 25 single material nozzles, such as disclosed in Vauch/Mueller, ibid, at p. 277, are installed in a spray drying tower of conventional design and holding about 200 cubic meters. A piston membrane pump, such as disclosed by Leuschner ibid, at p. 259 is located ahead of the nozzles. Pulsing is 2.5 percent. The polyvinyl chloride dispersion to be atomized holds 48 percent solids and 2 percent by weight of an emulsifier, referred to the PVC. The surface tension of the dispersion amounts to 39 dyne/cm. The tower input temperature is 160° C, the output temperature is 60° C. The dispersion is sprayed or atomized at 800 bar pressure with the nozzle output being 75 kg of dispersion per hour.

The dried polyvinyl chloride powder is sifted through a sieve with a mesh size of 300 microns. The coarse portion eliminated amounts to 0.3 percent. The powder so obtained is processed into a paste with 35 parts of dioctylphthalate and the rheological behavior of the paste is excellent.

The advance over the art achieved by the method of the present invention consists in the following:

1. No clogging of the single material nozzles whatever takes place at the preferred atomization pressure;

2. Low expenditure is achieved because of the higher efficiency of the single material nozzle when compared with the binary material nozzle, despite the high atomization pressures;

3. The compressed air ballast of the binary material nozzles drops out and flow conditions in the tower are more favorable because no turbulence due to the atomizing air occurs; Higher specific outputs of the drier are feasible; Drying efficiency is improved; and 4. Because the process may be carried out with nozzles diameters so slight that the powders are generated in sufficient fineness for good paste behavior, grinding and air sifting may be eliminated.

We claim:

1. In a method for preparing uniform, finely divided powdery vinyl chloride polymer particles by spray drying a dispersion of polymerized vinyl chloride or a polymerized mixture of vinyl chloride monomer and unsaturated polymerizable compounds with single material nozzles, the improvement comprising applying an atomization pressure in excess of 500bars wherein said atomization pressure is about 550 to 1000 bars.

2. The method of claim 1, wherein said polymer particles contain less than 2 weight percent particles having a diameter greater than 40 microns.

3. The method of claim 1, wherein said atomization pressure is achieved by a piston membrane pump.

4. The method of claim 1, wherein said nozzles have orifice diameters ranging from about 0.3 to 0.6 mm.

5. The method of claim 2, wherein said atomization pressure is about 650 to 900 bars.

* * * * *